(12) United States Patent
Arfin

(10) Patent No.: US 7,904,382 B2
(45) Date of Patent: Mar. 8, 2011

(54) METHODS FOR FINANCING RENEWABLE ENERGY SYSTEMS

(75) Inventor: David Arfin, Palo Alto, CA (US)

(73) Assignee: Solarcity Corporation, Foster City, CA (US)

( * ) Notice: Subject to any disclaimer, the term of this patent is extended or adjusted under 35 U.S.C. 154(b) by 14 days.

(21) Appl. No.: 12/046,236

(22) Filed: Mar. 11, 2008

(65) Prior Publication Data

US 2009/0234750 A1    Sep. 17, 2009

(51) Int. Cl.
G06Q 40/00    (2006.01)
G06Q 10/00    (2006.01)
(52) U.S. Cl. .............................. 705/38; 705/1
(58) Field of Classification Search ............... 705/35–42
See application file for complete search history.

(56) References Cited

U.S. PATENT DOCUMENTS

| | | | |
|---|---|---|---|
| 7,130,832 B2* | 10/2006 | Bannai et al. ................ 705/412 |
| 7,698,219 B2* | 4/2010 | Kremen et al. ................ 705/40 |
| 7,747,489 B2* | 6/2010 | Perg et al. .................... 705/35 |
| 7,752,105 B2* | 7/2010 | Perg et al. .................... 705/35 |
| 7,809,621 B2* | 10/2010 | Herzig ........................ 705/35 |
| 2003/0130865 A1* | 7/2003 | Fitzgibbon et al. ............. 705/1 |
| 2003/0225643 A1* | 12/2003 | Kakoschke .................... 705/35 |
| 2004/0093227 A1* | 5/2004 | Cho .......................... 705/1 |
| 2006/0155638 A1* | 7/2006 | de la Motte .................. 705/37 |
| 2007/0094040 A1* | 4/2007 | Erb et al. ..................... 705/1 |
| 2007/0150295 A1* | 6/2007 | Dawson et al. ................ 705/1 |
| 2007/0150366 A1* | 6/2007 | Yahiro et al. ................. 705/26 |
| 2008/0015873 A1* | 1/2008 | Shostack et al. ............... 705/1 |
| 2008/0086315 A1* | 4/2008 | Beatrez ...................... 705/1 |
| 2008/0091589 A1* | 4/2008 | Kremen ...................... 705/38 |
| 2008/0091590 A1* | 4/2008 | Kremen ...................... 705/38 |
| 2008/0091626 A1* | 4/2008 | Kremen ...................... 705/412 |
| 2008/0172330 A1* | 7/2008 | Kremen et al. ................ 705/40 |
| 2008/0172346 A1* | 7/2008 | Kremen et al. ................ 705/412 |
| 2008/0270276 A1* | 10/2008 | Herzig ........................ 705/35 |
| 2008/0319772 A1* | 12/2008 | Eikenberry ................... 705/1 |
| 2009/0024541 A1* | 1/2009 | Kremen ..................... 705/36 T |

OTHER PUBLICATIONS

"Case Study: Early exit from an above market lease", Samuel Plimpton. Journal of Corporate Real Estate. Bingley: 2005; vol. 7. Iss: 4; p. 300, 6 pgs.*
Berg, Joel, "Green Loans Touted as Profit Opportunity", American Banker, May 9, 2006.*
"GE Money & Electric & Gas Industries Association Help Homeowners Save Money, Improve Environment with Nationwide Solar Financing", Business Wire, Jul. 25, 2007.*
"Solar Financing: Solar Energy Equipment Financing Program", pp. 1-2, Solar Panels Plus website, c 2007.*
Hodges, Susan L., "Green Acres", ELT. Arlington: Jan 2008. vol. 20, Iss. 1; p. 20, 8 pgs.*
"Residential Financing Options for Renewable Energy Systems", Financing Option Fact Sheet, May 2004, pp. 1-2.*
Neil Zobler, & Melissa Payne. (Aug. 2003). Finding money for energy efficient projects. Energy User News, 28(8).*

(Continued)

Primary Examiner — Ella Colbert
Assistant Examiner — Mohammad Z Shaikh
(74) Attorney, Agent, or Firm — Fountainhead Law Group PC

(57) ABSTRACT

A business method for financing renewable energy systems includes offering a home loan to a homeowner in which the interest payable by the homeowner are tax deductable. A lease is also offered to the homeowner for the installation and use of a renewable energy system. A deposit of cash proceeds from the home loan is put into a trust held by an escrow agent for the single purpose of paying lease payments for the lease as each payment becomes due. Such that the proceeds from the home loan are effectively used to defease the debt represented by the lease.

14 Claims, 7 Drawing Sheets

OTHER PUBLICATIONS

Yankee gas services, co. Creates one-stop shopping for customers. (Feb. 2000). Pipeline & Gas Journal, 227(2).*

"Financial service company goes green—up to a point—as loans market heats up", Sunday Independent: Dublin (Mar. 18, 2007).*

* cited by examiner

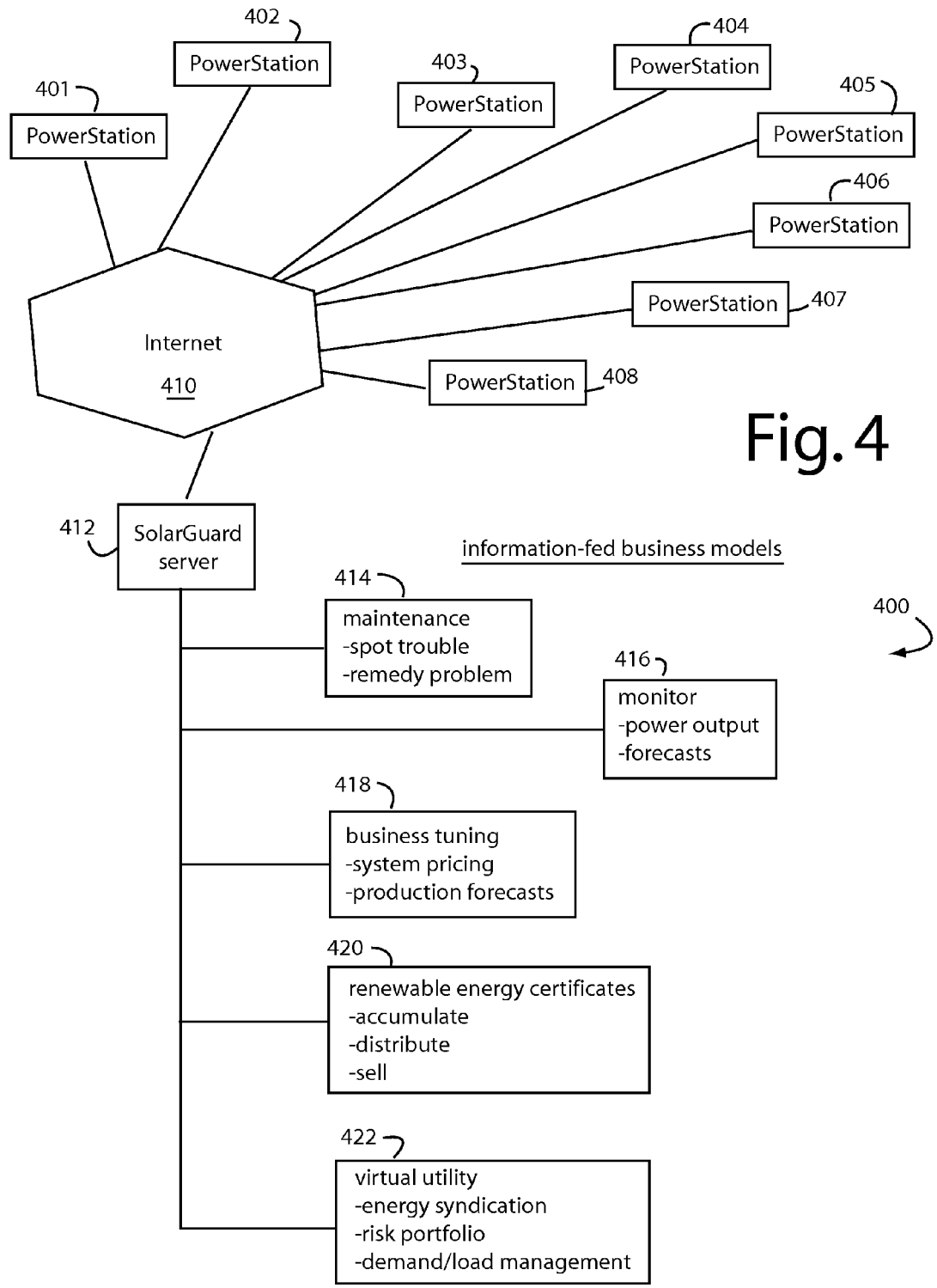

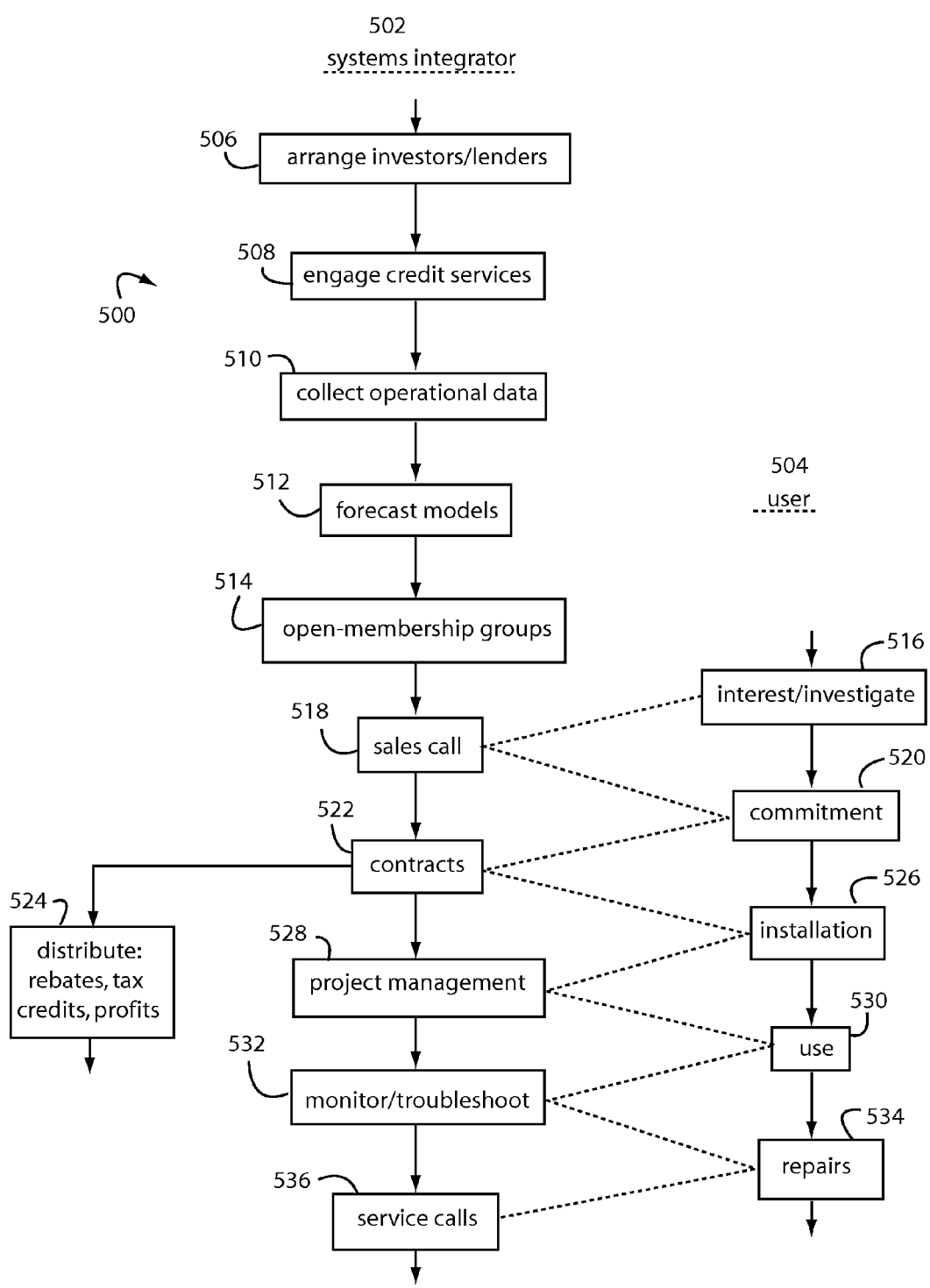

METHODS FOR FINANCING RENEWABLE ENERGY SYSTEMS

FIELD OF THE INVENTION

The present invention relates to renewable energy industry business methods, and more particularly to methods for financing and leasing renewable energy systems.

DESCRIPTION OF THE PRIOR ART

Beginning in 2008 with the "mortgage meltdown", tight credit markets have led to two problems for the average American looking to benefit from a personal renewable energy system lease. They now need a much higher credit scores than two years before to qualify for a lease, because credit markets impact availability and pricing. And, lessors began insisting on getting paid all the payments, or at least more of the payments upfront, e.g., by employing a "defeasance". Most lessors are now very averse to taking on the risk of unsecured credit.

Resources like coal, oil, and natural gas are not renewable, the known reserves are being consumed rapidly, and burning them and transporting them is a major cause of pollution and environmental damage. So, many people in general, and governments in particular, are looking for ways to get renewable energy systems launched and into mainstream use, both for profit, and for the environment we all share.

Many customers cannot come up with the big payment needed to prepay an energy system, a long-lived asset, especially when they are already paying down other higher interest loans.

The interest on home loans is tax deductible in many circumstances for most homeowners. The principle, even in a lease, is never deductible. So what is needed is a way to maximize the tax deductions and incentives available to homeowners wanting to install a renewable energy system.

Market revenues for solar, wind, biofuels and fuel cell clean technologies were $55 billion in 2006 and are expected to grow to $226 billion by 2016, according to industry research firm Clean Edge (March 2007). The federal government, utility providers, and city, state, and local agencies are offering incentives to make renewable energy more affordable for consumers. As a result, the investment market in the United States for energy efficiency is estimated to be $200 billion, according to the American Council for an Energy Efficient Economy.

Photovoltaic (PV) solar systems cleanly and silently convert sunlight into electrical energy. System integrators can install solar panel arrays at the point of consumption, e.g., on a customer's roof or in their side yard, to avoid transmission losses and costs. In addition, the electricity produced may be fed back to the utility grid at retail rates, which tend to be much higher than wholesale rates.

When exposed to strong light, the semiconductor devices in the panels produce low-voltage direct current (DC) electrical power, which is then converted to normal 110/220 volt utility-type alternating current (AC) by an inverter. The amount of energy produced by a single installation can be a substantial percentage of, or exceed, that used by a typical household. But, the up-front investment costs are very high, and the pay-back period is very long. The average American cannot afford the expense, nor deal with all the technical and legal complexities involved at the start.

Tax incentives can soften the up-front bite, but they are difficult to understand and take advantage of, and the government is forever toying with the terms of qualification. Many other technical and legal challenges also exist, and many local city building departments and local building trades lack the education, skill and training necessary to permit or do the construction. So, many potential owners who are leaning toward installing a renewable energy system, get discouraged and do nothing.

Typical residential systems retail for roughly $9-10 per watt DC. An average home may be able to support panels capable of supporting an installation of 4-5 kilowatt (kW) DC, which gives a total system cost of $40K-50K. Commercial systems can range from 5-100 kW DC, or more. Commercial installations are typically financed by third parties, leased, or the subject of a Power Purchase Agreement (PPA) or energy services contract. But, homeowners almost always pay cash for their systems, from savings or a home equity line of credit (HELOC) or other debt-like instruments. This large capital requirement further restrict how many homes actually get a solar system installed.

As a rule of thumb, each installed DC kW will produce roughly 1,500 AC kilowatt-hours (kWh) per year. Such can vary by latitude, roof orientation, weather, etc. Depending on the season, time of day, and local utility tariffs, a customer can expect to pay $0.05-$0.35 per kWh. Customers with large houses in hot climates tend to have significant electricity bills due to heavy use of their air conditioning systems; summer bills can easily exceed $400 per month.

Utility customers can use the solar output to reduce their use of utility power, and in many areas can sell back excess power to the utility.

Federal, state, and local governments, utilities, and agencies have put in place significant financial incentives for organizations that install solar systems. Such incentives can offset the initial capital investment required to get an organization up and running on solar power. In addition, many states have created programs to encourage the switch to solar power. California, New Jersey, New York, and Arizona all have innovative programs, and other states are quickly following suit, e.g., see, Database of State Incentives for Renewable Energy (DSIRE) (http://www.dsireusa.org/).

For example, the California Solar Initiative (CSI) is an incentive offered to help commercial, government, non-for-profit and residential customers acquire and pay for renewable energy systems. The type of incentive awarded by the program depends upon the size of the system installed. Most government and non-profit organizations are eligible for performance-based incentives that are paid in monthly installments based on the expected or actual recorded kWh of solar power produced over a five-year period. The more solar energy produced, the higher the payment.

At the federal level, tax-paying system owners are currently eligible to realize up to 30% of the system cost as a tax credit against their federal tax. Alternative minimum tax is not offset. The credit is generally not available to foreign entities, government agencies, non-profits, and non-US-taxpayers. The credit is presently capped at $2,000 for residences.

Each system owner is generally also allowed to take five-year MACRS depreciation, with a tax basis of 85% of the system cost. But, homeowners in particular cannot depreciate any elements of their residence. The current federal tax credit is set to expire at the end of 2008, unless an extension is passed. The Economic Stimulus Act of 2008 encourages investments by allowing 50% expensing for systems placed in service in 2008.

The California CSI program provides for rebates to the system owner, based on the owner's tax status and the size of the system. Large systems receive a Performance Based Incentive (PBI) rebate over five years, based on actual kWh production. Smaller (<50 kW) commercial and residential systems receive the rebate as a lump sum in an Expected Performance Based Buydown (EPBB) almost immediately after the system is placed into service.

These rebates are reduced in steps as more people participate in the program. The current status can be found online at www.sgip-ca.com. Some local municipal utility companies do not participate in the state incentive program, while others promote their own unique incentive structures.

In other states and utility districts, such as Oregon or North Carolina, incentives may include state tax credits, while in other locales, the incentives may be based on the RPS incentives, feed-in tariffs, or other methodologies.

In both California and Federal programs, the system must be held by the original system owner for at least five years to claim the full tax credit. Early transfer may result in an IRS recapture of a pro-rata share of the credits the benefits.

Data on recent applications to the CA state program, (see www.sgip-ca.com), indicate that system integrators, not homeowners themselves, were the largest residential installers in California in 2007 YTD, both in terms of number of deals and kw installed. The data also provide useful reference points on $/W rates across the industry; $9-10/Watt seems fairly typical.

Companies like MMA Renewable Ventures and SunEdison are now providing third-party finance solutions for renewable energy projects. These companies are investing in solar, wind, biofuels, biomass, biogas, and geothermal energy generation. MMA Renewable Ventures says it is able to offer customers and energy project developers substantial, consistent, reliable investment capital to meet and help drive growing demand.

Such companies enable customers to take advantage of predictably priced clean energy, and to overcome the prohibitive costs of installation and ongoing system maintenance. In a third-party proprietary financing model, a company such as MMA Renewable Ventures owns, operates, and maintains renewable energy facilities. It sells the electricity to its customers under the terms of a solar services agreement (SSA) that contracts the electricity produced at a fixed rate. Other companies partner with top-tier investors, project developers, and customers to build distributed clean energy generation plants. They then sell electricity and, optionally, renewable energy credits to a site-host under a power purchase agreement (PPA). By offering comprehensive energy efficiency project financing, customers avoid up-front costs, and projects are often cash flow positive from the start of commercial operation.

SUMMARY OF THE INVENTION

Briefly, a renewable energy financial product embodiment of the present invention begins with a homeowner loan and an equipment lease. Proceeds from the homeowner loan are used to fund an escrow account that guarantees a Lessor of the renewable energy system installation will receive all their payments over the term and a defeasance fee. The homeowner qualifies for tax deductions on the home loan, and the Lessor takes on a very low risk. The installation qualifies for additional energy credits and tax incentives that can be sold or otherwise applied to the profit margin.

These and other objects and advantages of the present invention will no doubt become obvious to those of ordinary skill in the art after having read the following detailed description of the preferred embodiments which are illustrated in the drawing figure.

IN THE DRAWINGS

FIG. 4 represents a SolarGuard system embodiment of the present invention, many PowerStations produce renewable energy from the sun, and each has a SolarGuard monitor that reports key operating information about their particular systems;

FIG. 5 represents an in-field sales method of operating a solar energy business;

DETAILED DESCRIPTION OF THE PREFERRED EMBODIMENTS

Figure 1:
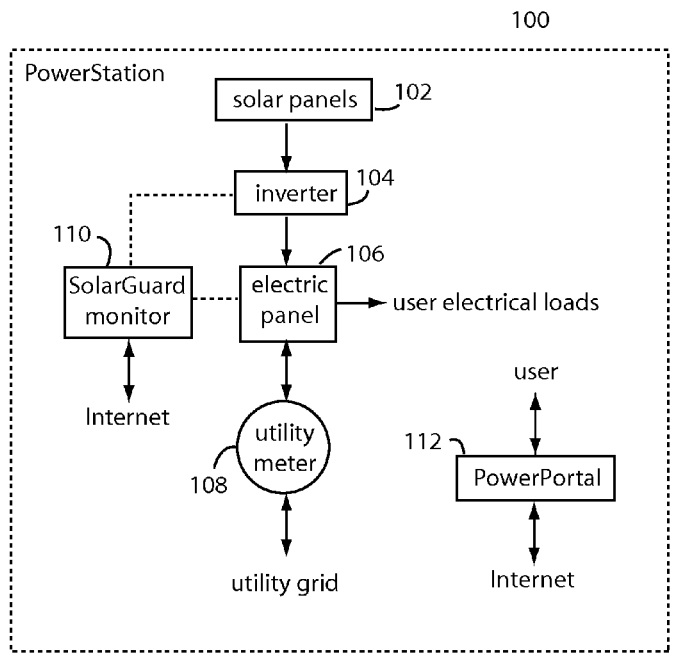
FIG. 1 is a functional block diagram of a business model embodiment of the present invention.

FIG. 1 represents a PowerStation™ embodiment of the present invention, and is referred to herein by the general reference numeral 100. PowerStation 100 is typically located at an owner's home, and comprises photovoltaic solar panels 102 that convert sunlight into low-voltage DC. The DC can be stored in batteries, or it can be further converted into, e.g., 110 VAC, 220 VAC, or 480 VAC, by an inverter 104. An electric panel, or breaker box, 106 has the fuses and circuit breakers that distribute electricity to the user's electrical loads. Any excess electrical power from the inverter 104 will push back through a utility meter 108, and can actually run it backwards. A utility grid may be under contract or other legal obligation to accept and pay for such excess power produced. Often retail rates apply.

A SolarGuard™ monitor 110 tracks the performance of the solar system and reports the data to a central location over the Internet. The monitoring makes sure the system is producing solar energy at optimum levels, and computed data is made available on a webpage. A PowerPortal™ 112 allows users to log in to a secure website to check the system performance, as reported by the SolarGuard monitor 110. Users can find out how much power the system is generating at any time.

Each PowerStation 100 can be standardized or unique, configured to the custom specifications of each user. In a business model embodiment of the present invention, a system integrator goes to the location to determine the best size, mounting arrangement and positioning for the PowerStation 100. A detailed design and installation plan can then be engineered.

PowerStations 100 work in parallel with the electric utility grid, allowing electricity to be generated during the day, and loads to draw from the grid during the night. In many areas, the system integrator sets up a net metering relationship with the local utility, enabling users to sell excess power back to the utility during peak hours when rates are high, and to buy electricity during non-peak hours when the rates are low.

Figure 2:
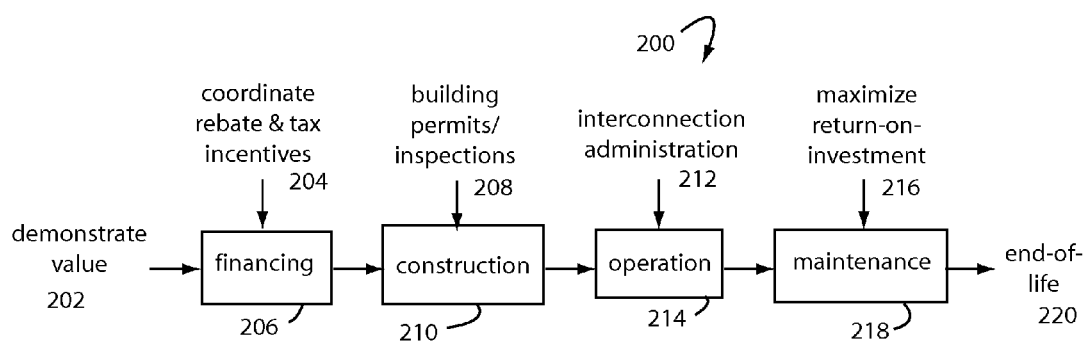
FIG. 2 represents an administrative services embodiment of the present invention, and comprises demonstrating financial value and coordinating rebate and tax incentives to arrange for financing.

FIG. 2 represents an administrative services embodiment of the present invention, and is referred to herein by the general reference numeral 200. Administrative services 200 comprises demonstrating financial value 202 and coordinating rebate and tax incentives 204 to arrange for financing 206. Plans are submitted so building permits and inspections 208 can be obtained for construction 210 of the solar system, as in FIG. 1. The involved utilities are coordinated with interconnection administration 212 and the solar system is put into operation 214. A return-on-investment (ROI) is maximized 216 and maintenance 218 service may be negotiated. At an end-of-life 220, or end-of-lease, the full value of the installation of the solar system is realized for the user, the lender, the system integrator, and the government.

Demonstrating the financial value 202 includes sending experts to the site and discovering how energy is used. The financial incentives available are identified, including rebates, tax, and special programs that a user or their business may be eligible. The system integrator obtains and completes the paperwork and follow-up required to receive state rebates. The financing can include floating rebate incentives, by only billing for the post-rebate amounts. Tax documentation is provided to enable a tax advisor to file the appropriate tax returns to take advantage of the available tax credits and deductions. Building permits, inspections, and all interactions with local permit offices are coordinated by the system integrator, and representatives are present during the final site inspection to deal with any issues that come up.

The system integrator further initiates the necessary agreements with the local utility company and schedules the required site inspections. A payment strategy is tailored to meet the user's needs and designed to make good financial sense well into the future.

The SolarGuard monitor 110 enables continuous monitoring of the key performance variables of the system, and transmit the data through the Internet to specialized servers. If the system is underperforming, alerts are sent to call attention to the situation. The collected data is accessible online for customers or other approved entities to view.

During the investigation and design phase, an expert may consult on how the user can lower their energy consumption and increase the savings. Each energy efficiency expert evaluates the insulation, ill-fitting windows and doors, old and outdated light fixtures, thermostat settings, office equipment with go power-save modes when not in use, occupancy sensors that automatically turn off lights when a room is vacated, heating and cooling systems, and which utility rate schedule will be optimal.

Finance products include power purchase agreements (PPA's) and leases. Non-taxable customers are provided with solar energy power and monthly payments that are often less than their current utility bill, with little or no up-front costs and off-balance sheet solutions. The PPA's help guard a company against the destabilizing effects of rising utility prices. The organization's risk is reduced by paying only for what the system produces under the PPA or lease.

Public and non-profit organizations can implicitly benefit from the tax incentives for which they would otherwise not be eligible, and rebates available through local, state, and federal governments. These incentives are significant, and can amount to more than 75% of the total system cost.

Generating clean energy has a social utility and can produce goodwill that translates directly into better business.

One return-on-investment (ROI) on a solar system comes from the avoided cost of utility bills that would have been paid instead of solar power. Most organizations see returns of 8-15% on their solar investments. In California, where grid electricity costs have consistently risen by more than 5% per year, the ROI can be even better. The cost of a solar installation can usually be recovered within 5-7 years, depending on where the customer's facility is located, and how much electricity they use.

Utility companies will often bill customers with tiered rates or time-of-use, rather than on flat fee basis. For a tiered rate, the plan begins with a baseline allocation of power. The more "units" of electricity customers consume above that baseline, the more they pay per unit. Solar power replaces the higher-tiered power first by taking the load off the top. Customers can thus experience significant savings immediately.

When users switch to solar power in certain jurisdictions, such as in investor owned utilities in California, they can be converted to a time-of-use billing system. The rates are higher during peak hours than during off-peak hours. The solar system will produce when the sun is brightest and the day is hottest, heavy air conditioner use and power demand on the grid makes these the peak times. Any power in excess of what they use is sold back to the utility grid at retail prices. At night, the solar system stops producing, but the users draw from the grid at much lower off-peak prices. During the spring and summer months, customers can accumulate credits. These can be used to offset the customer's energy use during the winter months with its shorter daylight periods.

Finance leases, e.g., capital leases, conditional sales, or dollar buy out leases, may work best if the solar power user intends to keep the equipment after the end of the lease. The main advantage of this type of lease is that it gives the user the option to purchase the equipment for a nominal fee. Payment terms on finance leases tend to last close to the expected useful life of the equipment.

True leases, also called tax leases, operating leases, or fair market value (FMV) leases, do not typically last as long as the full expected life of the equipment. At the end of the lease, the user can choose to have the equipment removed without incurring further obligations, or purchase it at a fair market value. Payments on true leases generally tend to be lower than those on finance leases. The lessors have the opportunity to resell the equipment when the lease ends.

One of the main benefits of true leases is that lessors may be able to fully deduct their lease payments and claim incentives which accrue to the equipment owner for tax purposes; these savings can be passed on to the lessee in the form of lower rents. In contrast, the IRS considers finance leases little more than installment purchase plans. As a result, although finance leases let customers spread the customer's payments over time, they are not tax advantaged in the way true leases are, and lessees frequently cannot utilize the tax incentives available to them.

A leveraged lease is a tax-advantaged, asset-based financing that typically qualifies as an operating lease for accounting purposes, and a true lease for tax purposes. It can provide 7-30 years of off-balance sheet financing priced below the lessee's alternative borrowing rate. In a leveraged lease, a trust is established with equity and non-recourse debt components. The transaction is structured such that the equity investor is considered to be the owner of the equipment, both for accounting and tax purposes. From the lessee's perspective, the lease is an off-balance sheet financing with footnote disclosures.

A leveraged lease allows high-grade credit lessees to take advantage of their low cost of capital to achieve low stable rental rates over a 15-25 year term. The system integrator arranges high leverage debt financing based upon the quality of the lease and user's credit rating. This attractive debt financing usually results in a lower cost of capital to the system integrator and therefore a lower lease rate for the user. If the transaction meets minimum size requirements and includes rapidly depreciable items, tax advantaged equities can be provided to the project thereby further lowering the user's lease rate. Similar to the conventional lease, a leveraged lease is usually structured to qualify as an operating lease in accordance with Generally Accepted Accounting Principals (GAAP).

A lease which qualifies under financial accounting standards FASB 13 as an operating lease, has the following four criteria: (1) The lease term does not exceed 75% of the useful life of the equipment, (2) Title to the equipment does not automatically pass to the lessee at the end of the lease term, (3) The lease can not have a bargain purchase option, and (4) The present value of the minimum rentals must be less than 90% of the equipment cost. An operating lease may not add balance sheet asset or liability, and the rental payments are treated as an operating expense. A True Lease is not necessarily an Operating Lease.

A structured operating lease can mean the lowest possible cost for a corporate client due to its use of a variable interest rate, lack of amortization, and its short term. This lease type requires the lessee to maintain complete economic control of the property as well as accept all economic risks and rewards of ownership. Unique to this structure, the lessee maintains responsibility for the residual value of the asset at the end of the lease. At the end of the initial lease term, the lessee can either renew the lease at the then prevailing rates and terms, purchase the property for the initial development or acquisition cost, or sell the property and generate either a gain or loss based upon the value at the time the option is exercised. This lease/financing alternative is structured to qualify as an operating lease in accordance GAAP. It can also be based upon a fixed rate, which results in a slightly higher lease rate. This alternative is not available for properties previously owned by the corporate client. Consequently, sale-leaseback transactions cannot be arranged using this alternative.

A single investor lease (SIL) is a tax-advantaged asset-based financing which typically qualifies as an operating lease for accounting purposes and a true lease for tax purposes. Depending on the customer's position, the SIL can provide 7-25 years of off-balance-sheet financing priced below the client's alternative borrowing rate. The transaction is structured so the lessee is not considered the owner for either accounting or tax purposes. From the lessee's perspective, the lease is off-balance sheet financing with a footnote disclosure. Such product is applicable for new and used equipment, project financings and some forms of real estate. Benefits to customers can include improved earnings through lower rental payments, hedging against equipment obsolescence, attractive after-tax financing rates, and diversification of funding sources.

In a business model embodiment of the present invention, a typical system integrator purchases the major components for a renewable energy system from large, established vendors. Solar panels usually have a manufacturer's warranty of 10-25 years, and the inverters are typically warranteed for 5-10 years. Such hardware presently represents about 50% of the total system cost. A user 108 could be required to cover the cost of an inverter replacement after the inverter's warranty expires. The power output of a typical solar panel degrades about 0.5% per year, and will likely provide a useful life of thirty years.

The system integrator or a $3^{rd}$ party, provides some well-defined repair and maintenance functions during the life of the installation. The operating performance of each installation is remotely monitored, e.g., to anticipate breakdowns and interruptions of revenue earning. Each project generally requires insurance against risk of theft, damage, etc.

Leases are generally more complex than a standard purchase. But, leases allow customers to realize the best possible savings on going solar, and they allow the customer to avoid substantial upfront capital costs of installing a solar system. The benefit of federal incentives, which would otherwise go unclaimed, can be split between the customer, system integrator, and the investor. For tax purposes, such leases must qualify as an operating lease. For generally accepted accounting procedure (GAAP) purposes, such leases can also qualify as an operating lease, although it may be possible to obtain different treatment for GAAP than for tax accounting.

System integrator leases are secured by the equipment, and may be structured to be secured by a lien on the underlying real estate. Each potential lessee/customer is screened to meet credit acceptance criteria. During the lease period, the customer makes lease payments. The payments may be flat across the life of the lease, or they may be structured to escalate over time in step with energy cost inflation or some other index. At around $200/month, depending on system size, many typical homeowners will find that they can act in an environmentally and socially responsible way while spending the same, or less, on electricity costs.

Residential customers are given fair market value buyout options, which are priced so that they would not fail one of the capital lease tests. At the end of the lease, each customer can choose to extend the lease and continue making payments, purchase the system at a fair market value, or end the relationship and return the equipment.

Making existing equipment more energy efficient is one way to meet growing energy demand. Energy efficiency projects can improve profits, help avoid power outages, and delay the need for new power plants. The annual market for energy efficiency in the USA has been estimated at $200 billion. Typical energy efficiency projects have payback periods of five years or less. Energy efficient equipment can also increase property values. A commercial building owner can generate $2-$3 in added asset value for every one dollar invested in energy efficiency.

In a business model embodiment of the present invention, a system integrator finances, owns and/or manages non-residential energy efficiency projects. Combined energy efficiency retrofit projects for investment can include heating, ventilation and air conditioning (HVAC), high-efficiency lighting, motor and pump replacements, high-efficiency refrigeration systems, energy management and controls systems, high efficiency cogeneration systems, boiler and furnace replacements, etc.

Up to one hundred percent of the financing for the capital cost of a project can be provided so customers are not required to make any significant project capital outlays. Whenever possible, efficiency projects are integrated with solar or other renewable energy systems, to better maximize combined economic, environmental and investment benefits.

A power purchase agreement (PPA) embodiment of the present invention includes a service contract between the system integrator and a customer. The system integrator agrees to finance, own and operate a solar energy system at the customer's location and sell the electricity it generates to the customer for a pre-determined period. The system integrator agrees to offload the entire process of permitting, designing, procuring, and installing the system. It owns and operates the system, including operations, maintenance, and insurance. The customer has the option to buy the system. The customer provides an installation site, and access to site for operations and maintenance, e.g., by land lease or recorded easement. Such projects can be cash flow positive from day one, as the customer only pays for power the system generates, and benefits from long-term fixed energy price for the full term of the contract. On the subject of the kinds of leases that would qualify for tax advantages, FASB 13, Accounting for Leases, establishes standards of financial accounting and reporting for leases by lessees and lessors. For lessees, a lease is a financing transaction called a capital lease if it meets any one of four specified criteria. If not, it is an operating lease. Capital leases are treated as the acquisition of assets and the incurrence of obligations by the lessee. Operating leases are treated as current operating expenses. For lessors, a financing transaction lease is classified as a sales-type, direct financing, or leveraged lease. To be a sales-type, direct financing, or leveraged lease, the lease must meet one of the same criteria used for lessees to classify a lease as a capital lease, in addition to two criteria dealing with future uncertainties. Leveraged leases also have to meet further criteria. These types of leases are recorded as investments under different specifications for each type of lease. Leases not meeting the criteria are considered operating leases and are accounted for like rental property.

Operating leases are accounted for by the lessor in three ways. The leased property is included with or near property, plant, and equipment in the balance sheet. The property is depreciated according to the lessor's normal depreciation policy, and in the balance sheet the accumulated depreciation is deducted from the investment in the leased property.

Or, rents are reported as income over the lease term as it becomes receivable according to the provisions of the lease. However, if the rentals vary from a straight-line basis, the income are recognized on a straight-line basis unless another systematic and rational basis is more representative of the time pattern in which use benefit from the leased property is diminished, in which case that basis are used.

Lastly, initial direct costs are deferred and allocated over the lease term in proportion to the recognition of rental income. However, initial direct costs may be charged to expense as incurred if the effect is not materially different from that which would have resulted from the use of the method prescribed in the preceding sentence.

Embodiments of the present invention are not limited to these specific kinds of leases, since leasing rules can change significantly in the future.

The sale of property subject to an operating lease, or of property that is leased by or intended to be leased by the third-party purchaser to another party, is not treated as a sale if the seller or any party related to the seller retains substantial risks of ownership in the leased property.

A seller may, by various arrangements, assure recovery of the investment by the third-party purchaser in some operating lease transactions and thus retain substantial risks in connection with the property. For example, in the case of default by the lessee or termination of the lease, the arrangements may involve a formal or informal commitment by the seller to (a) acquire the lease or the property, (b) substitute an existing lease, or (c) secure a replacement lessee or a buyer for the property under a remarketing agreement. However, a remarketing agreement by itself does not disqualify accounting for the transaction as a sale if the seller (a) will receive a reasonable fee commensurate with the effort involved at the time of securing a replacement lessee or buyer for the property and (b) is not required to give priority to the re-leasing or disposition of the property owned by the third-party purchaser over similar property owned or produced by the seller. For example, a first-in, first-out remarketing arrangement is considered to be a priority.

If a sale to a third party of property subject to an operating lease or of property that is leased by or intended to be leased by the third-party purchaser to another party is not to be recorded as a sale, the transaction are accounted for as a borrowing. Transactions of these types are in effect collateralized borrowings. The proceeds from the sale are recorded as an obligation on the books of the seller. Until that obligation has been amortized under the procedure described herein, rental payments made by the lessee(s) under the operating lease or leases are recorded as revenue by the seller, even if such rentals are paid directly to the third-party purchaser.

A portion of each rental may be recorded by the seller as interest expense, with the remainder to be recorded as a reduction of the obligation. The interest expense are calculated by application of a rate determined in accordance with the provisions of APB Opinion No. 21, Interest on Receivables and Payables, paragraphs 13 and 14. The leased property is accounted for, as prescribed in paragraph 19(a) for an operating lease, except that the term over which the asset is depreciated are limited to the estimated amortization period of the obligation. The sale or assignment by the lessor of lease payments due under an operating lease are accounted for as a borrowing.

Solar can be an expensive, complex undertaking if each homeowner tries to calculate the return on a major investment, find a reliable installer, and learn about inverters and time-of-use metering. The shared knowledge and camaraderie of a community program makes each project much easier and more profitable.

Figure 3A:
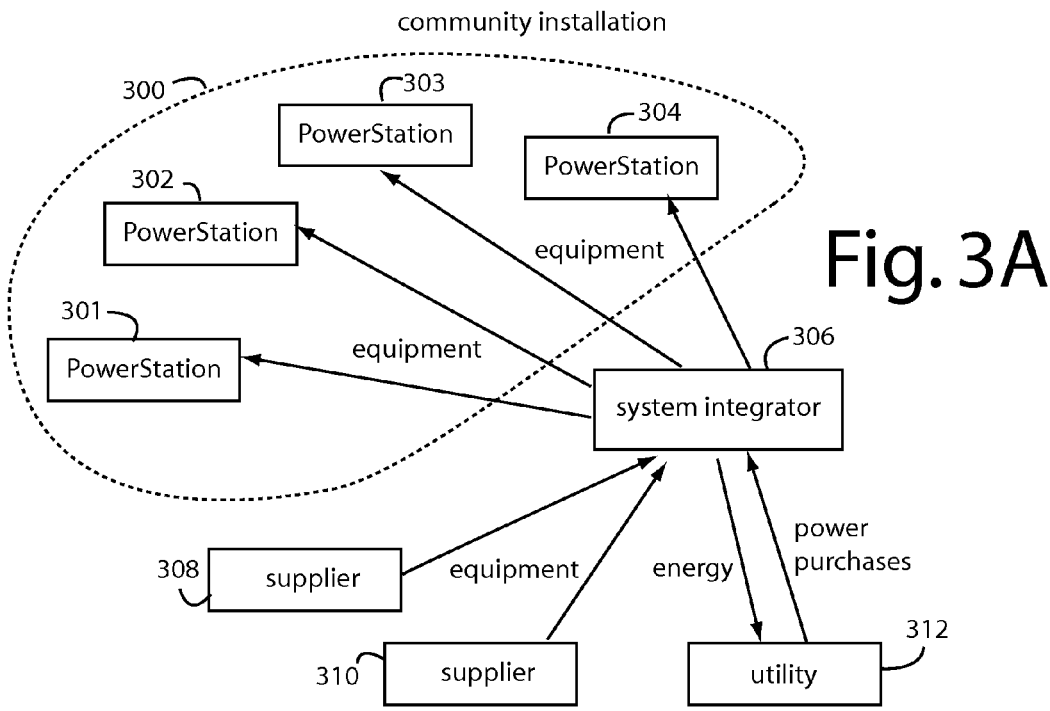
FIG. 3A represents a community installation comprising individual PowerStations. The individual users of are banded together in a community project by a system integrator.

FIG. 3A represents a community installation 300 comprising individual PowerStations 301-304. The individual users of PowerStations 301-304 are banded together in a community project by a system integrator 306. Various equipment suppliers 308 and 310 are contracted by the system integrator 306 to supply the necessary components for the construction of PowerStations 301-304 at a substantial discount. Discounts are possible because of the volume of equipment involved in a single contract, the geographical proximity of multiple accounts, and in respect of an on-going business relationship between system integrator 306 and equipment suppliers 308 and 310. Similarly, system integrator 306 enters into power purchase agreements (PPA) with a power utility 312 in which the individual users of PowerStations 301-304 sell their excess energy in large contracts otherwise only possible between utilities.

Community efforts go a long way toward bringing solar energy to the masses and making a bigger difference in the fight against global warming. The bulk discounts mean homeowners benefit from economies of scale, making it cheaper to convert to solar and quicker to receive a payback on the investment. Consumer awareness about solar power increases, which aids future sales efforts.

By signing up clusters of homes, the system integrator 306 benefits from economies of scale in equipment purchases, engineering, installation and permitting. In a typical program, a community 300 that collectively purchases a total of 175 kilowatts of solar capacity can qualify for discounts off market prices for equipment and installation. A typical home under the program would thus pay around $8.00 a watt for a three kilowatt solar system, compared to a market price of $10 a watt for the same solar system.

After factoring-in a state rebate and a federal tax credits for solar energy, and the cost of city permits, the total investment would be substantially reduced. By generating their own power and selling excess power back to the grid, homeowners can sharply lower or eliminate their electric utility bills.

Figure 3B:
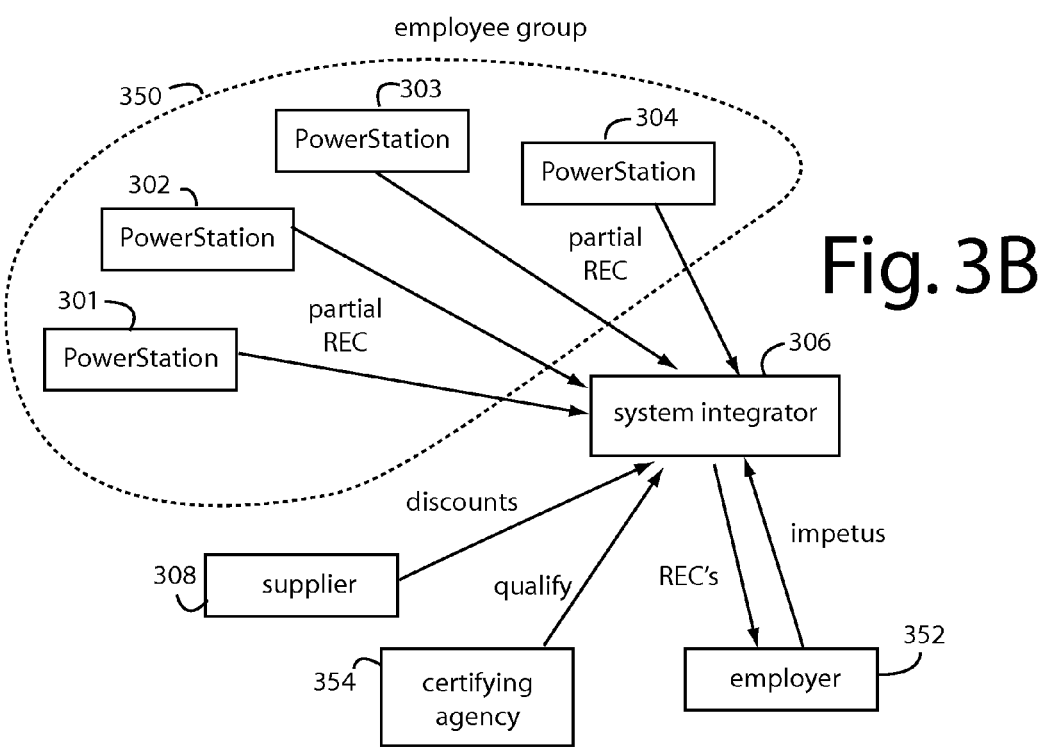
FIG. 3B represents a variation on a community installation in which employees of an employer are provided with a discounted solar system as a perquisite, and the employer benefits from renewable energy credits (REC's)

FIG. 3B represents a variation on community installation 300. An employee group 350 includes individual installation, e.g., as represented PowerStations 301-304. The individual users of PowerStations 301-304 are employees of an employer 352 who wants to provide perquisites to its employees and benefit, e.g., from renewable energy credits (REC's). The installations are gathered together in a group project by system integrator 306. A certifying agency 354 empowers the system integrator 306 to verify energy production, aggregate partial REC's, and certify the REC's it issues to the employer 352.

FIG. 4 represents a SolarGuard system embodiment of the present invention, and is referred to herein by the general reference numeral 400. System 400 communicates with many PowerStations 401-408 that produce renewable energy from the sun. Such solar power installations are like that described in FIG. 1, and each can be related to the other by location, who was their system integrator, who was their financer, who was their lessor, community interests, government jurisdiction, etc. Each has a SolarGuard monitor 110 (FIG. 1) that reports key operating information about their particular systems. For example, data reports can be collected periodically about current/voltage/power coming from the solar panels 102 (FIG. 1), outside temperatures at their respective locations, operating temperature of the inverter 104 (FIG. 1), user electrical loads supplied by electrical panel 106 (FIG. 1), utility meter 108 readings, condition of the utility grid at that feed-point, occupancy sensors, building temperature, etc. The information collected is identified by station ID and forwards through the Internet 410 to a SolarGuard server 412.

The data collected is separated and post-processed for several different information-fed business models. Such business models include maintenance 414, monitoring 416, business tuning 418, renewable energy certificate programs 420, virtual utility 422, performance guarantees, insurance, data sales, etc.

Maintenance business model 414 operates to spot trouble in the equipment, or the way it's being operated, at each PowerStation 401-408. Each of the data points being monitored has a normal range, and excursions outside these normal bands can be an early signal of trouble. However, some measures normally fluctuate as dependent variables on some independent variable. For example, the time-of-day and day-of-the-year control whether there should be any sunlight at all. The solar panels 102 cannot be expected to produce an electrical output between local sunset and sunrise. But if the solar panels 102 are not producing during daylight hours, then there may be a problem that needs to be analyzed or investigated further. Solar panel power output measurements can also be compared to local weather, other sensor measurements, past measurements, averages, and what other nearby PowerStations 401-408 are doing at the moment.

Maintenance business model 414 operates to remedy trouble. In some cases, the trouble might be fixed by downloading new software or parameters to the respective SolarGuard monitor 110, or inverter. In other cases, an email or phone call to the user might do it. In more serious or difficult situations, a repair crew can be sent out.

Maintenance business model 414 may also collect and analyze long-term trends to spot equipment supply problems, user misunderstandings, and recalls and retrofits. Conventional methods could be used in a suitable maintenance program.

Monitoring business model 416 operates to monitor power output from particular installations and to help sharpen forecasts of what these systems are really capable of. The data collected can be analyzed and used in sales to tell customers what they can expect in the way of performance and up-time, and in power-purchase-agreements to confidently contract for maximum production commitments.

Monitoring business model 416 further operates to load manage power at discrete installations, e.g., to balance loads amongst installations in an area during peak times, or to shift loads from peak times to off-peak times at particular locations.

Business tuning business model 418 collects information to help the sales department give better pricing estimates and fit the expected energy production to the customer's needs.

Renewable energy certificate business model 420 accumulates, distributes, or otherwise sells "green tags". According to Wikipedia, renewable energy certificates (REC's), also known as green tags, renewable energy credits, or tradable renewable certificates (TRC's), are tradable environmental commodities that represent proof that one megawatt-hour (MWh) of electricity was generated from an eligible renewable energy resource. Before the present invention, it wasn't possible or practical for a small individual solar system installation to participate in REC trading markets.

These certificates can be sold and traded and the new owner of the REC can claim to have purchased renewable energy. While traditional carbon emissions trading programs promote low-carbon technologies by increasing the cost of emitting carbon, REC's can incentivize carbon-neutral renewable energy by providing a production subsidy to electricity generated from renewable sources.

Wikipedia says, in states which have a REC program, a green energy provider is credited with one REC for every 1,000 kWh or one MWh of electricity it produces. An average residential customer consumes about 800 kWh in a month. A certifying agency gives each REC a unique identification number to make sure it doesn't get double-counted. The green energy is then fed into the electrical grid, and the accompanying REC can then be sold on the open market.

According to the Green Power Network, prices of REC's can fluctuate greatly (2006: from $5-$90 per MWh, median about $20). Prices depend on many factors, such as the location of the facility producing the REC's, whether there is a tight supply/demand situation, whether the REC is used for RPS compliance, even the type of power created. While the value of REC's fluctuate, most sellers are legally obligated to "deliver" REC's to their customers within a few months of their generation date. Other organizations will sell as many REC's as possible and then use the funds to guarantee a specific fixed price per MWh generated by a future wind farm, for example, or making the building of a solar power home financially viable.

The income provided by REC's, and a long-term stabilized market for tags can generate the additional incentive needed to build renewable energy systems. One of the few non-profit U.S. organizations that sell RECs, Bonneville Environmental Foundation was instrumental in starting the market for RECs with their Green Tag product. They use the profits from Green Tags to build community solar and wind projects and to fund watershed restoration. Another non-profit currently selling RECs is Conservation Services Group, which sells Climate-SAVE RECs generated from wind, solar, and hydropower.

The virtual utility business model 422 allows for the organization of energy syndications, risk portfolios, and demand/load management. Some or all of the PowerStations 401-408 can be brought together in a collective in which they produce and demand power in a coordinated fashion. The collective can enter into energy sharing and usage contracts with the local utility, and thus be able to buy off-peak power and sell on-peak power at attractive rates that are better than any individual or single business could manage on their own.

In a risk portfolio, the PowerStations 401-408 can all be brought together in a form of group insurance that protects each one of them from individual equipment failures and loss of production. The expense and risk of point failures is shared by all.

In a demand/load management model, a virtual utility contracts with a utility to limit individual point demand or total demand from a utility. It may agree to rolling outages, etc. Controls can be installed at each site to shed loads that are optional or discretionary, on request, or automatically.

FIG. 5 represents a method of operating a business, and is referred to herein by the general reference numeral 500. A systems integrator 502 is engaged in the business of selling, installing, and operating renewable energy systems for individual users 504. For example, a typical user 504 would be the resident of a single-family home in the suburbs.

The system operator 502 prearranges investors and lenders in anticipation of sales, in a step 506. Credit services are engaged in a step 508 that would allow the system integrator 502 to secure lending and/or investment commitments, e.g., over the phone, while in the field at a user's home. These could be supported by portable computers and wireless Internet access. The system operator 502 has an on-going program, in a step 510, to collect operating data about the performance of its previously installed systems, e.g., as described in connection with FIG. 4. Such data is analyzed to produce forecast models in a step 512 for various proposed systems. Open-membership groups are created in a step 514 that would allow a new user 504 to join-in on a preexisting virtual utility, PPA, community installation, etc.

In a step 516, a new user 504 shows interest and/or investigates the purchase of a solar system, e.g., as in FIGS. 1-3. The system integrator 502 makes an in-field sales call 518 in which the costs/benefits are described, and pro-form a systems configurations and performance/benefit forecasts are demonstrated. For example, with the help of a portable personal computer and wireless Internet. If sold, the user 504 makes a commitment 520 and signs a contract 522. Credit services 508 are used on-the-spot in the field to fund/close the deal, and the new user 504 joins the open-membership group to share in their collective benefits.

Method 500 generates all the necessary contracts, rebate coupons, renewable energy certificates, tax credit forms and supporting documentation, in a step 524, and distributes these and the profits to the various stakeholders.

The solar system, e.g., is installed in a step 526 with project management 528 provided by the system integrator 502. During use 530, the system installation is monitored in a step 532 and troubleshooting is used to access any anomalies. Repairs 534 are effectuated, e.g., by service calls 536.

Figure 6:
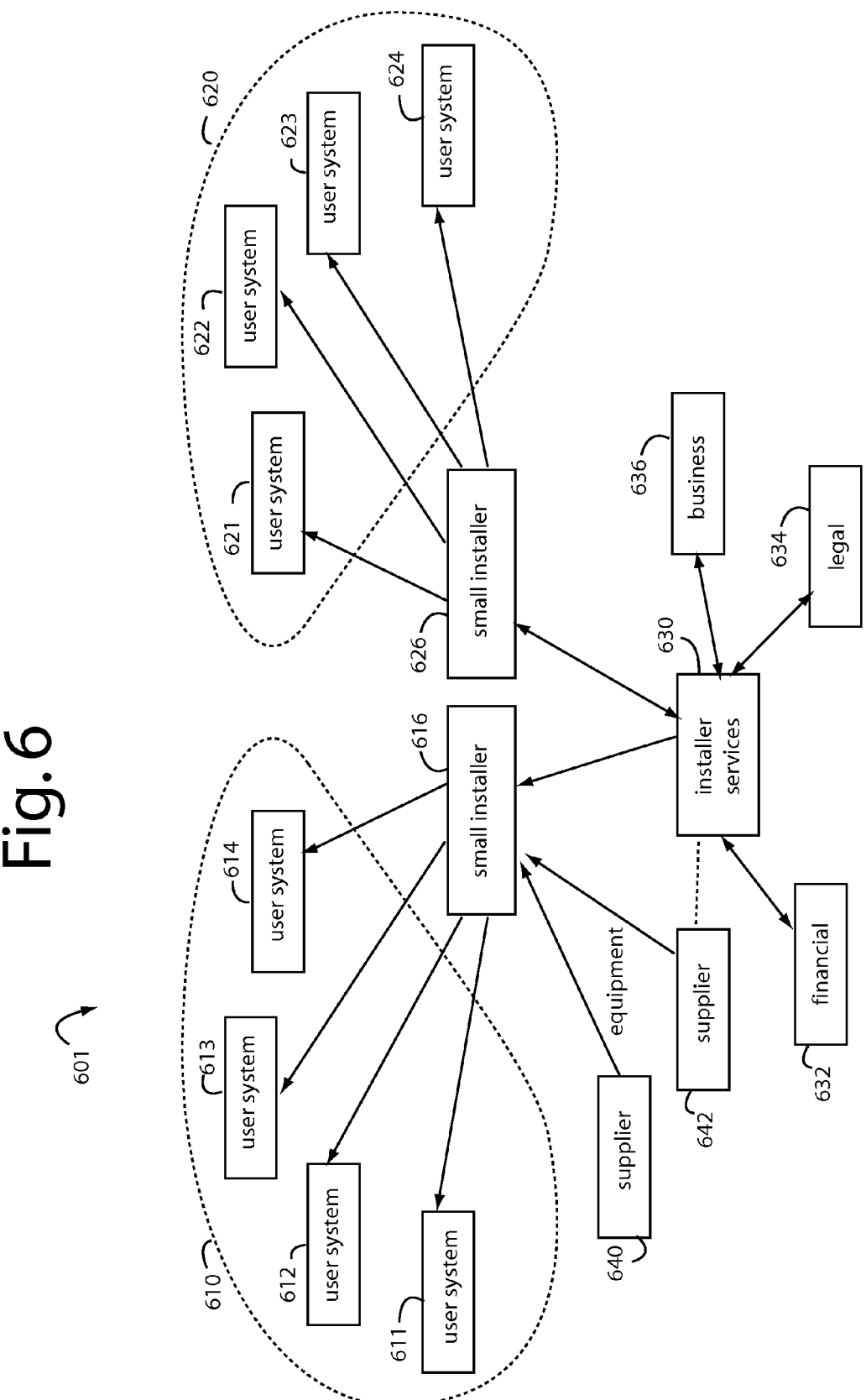
FIG. 6 represents an installer services business model embodiment of the present invention.

FIG. 6 represents an installer services business model embodiment of the present invention, and is referred to herein by the general reference numeral 600. A first group 610 of solar installations is represented by user systems 611-614. These are installed by a small installer 616. A second group 620 of solar installations is represented by user systems 621-624. These are installed by another small installer 626. Installers 616 and 626 do not operate on a large enough scale to have a significant degree of bargaining power with suppliers, utilities, investors, financial institutions, etc. They may also lack the sophisticated tools, models, and monitoring facilities that a large system integrator 630 has. So, system integrator 630 provides or coordinates financial, legal, business, and other services that they have bargained for with financial, legal, business and other institutions 632, 634, 636, etc. Each small installer 616 and 626 may be supplied by their own suppliers 640 and 642, but the market power exerted by large system integrator 630 allows it to use a special relationship or agreement with supplier 642 to provide special equipment at attractive discounts.

Figure 7:
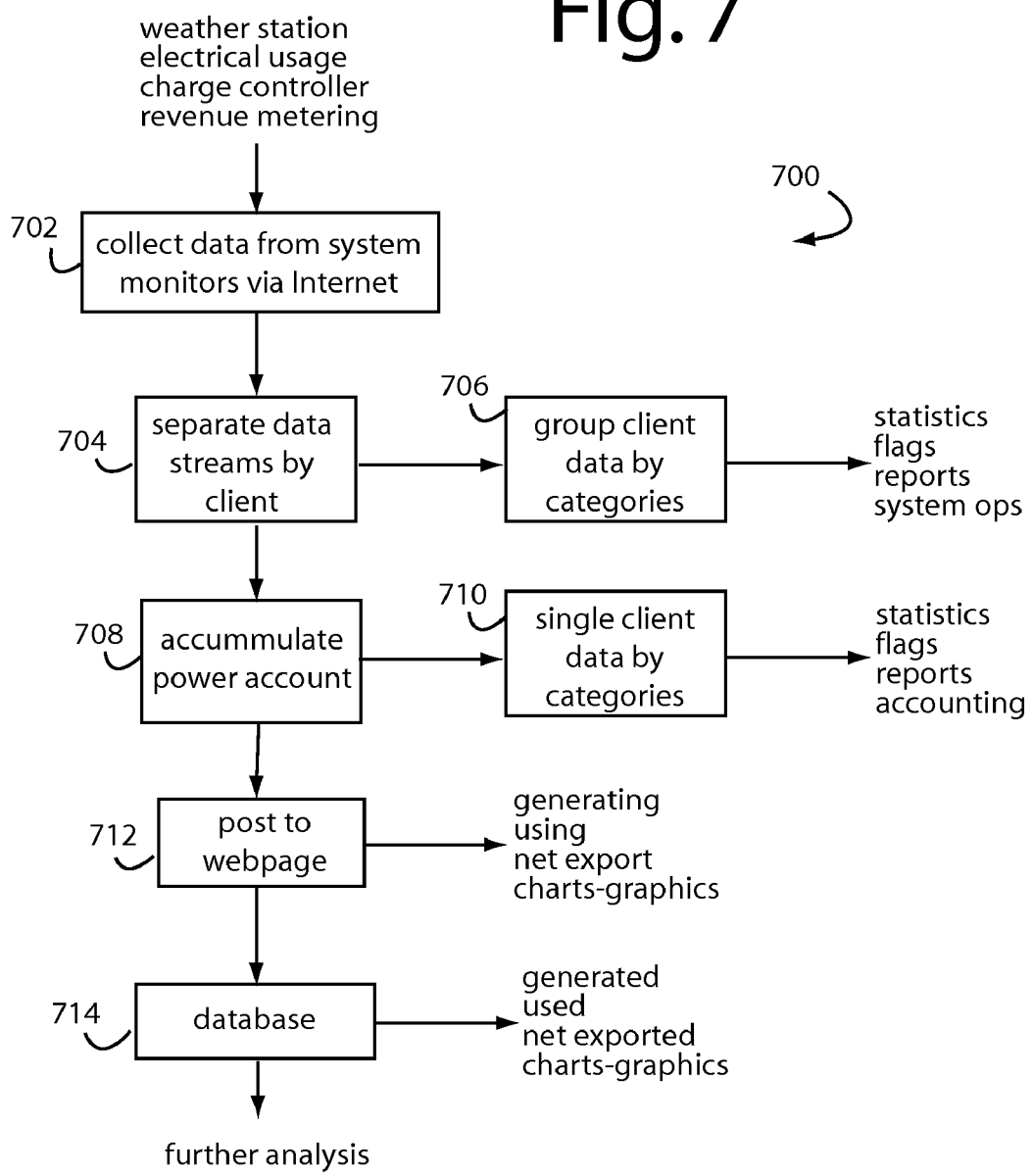
FIG. 7 is a flowchart diagram representing a monitoring system that operates from a central server.

FIG. 7 represents a monitoring system 700 that operates from a remote location, such as a central server, to monitor renewable energy system operation, and is similar to model 416 in FIG. 4. Monitoring system 700 operates to monitor power output from particular installations in the field. The individual owners have access to their own monitored data through a webpage posted on the Internet, and the system integrator can view individual or combinations installations.

In one application, such collected data is used to help sharpen forecasts of what the renewable energy systems are really capable of. The data collected can be analyzed and used in sales to contract with customers what they can be guaranteed in the way of performance and up-time. The results are useful in power-purchase-agreements to set maximum production commitments. Embodiments of monitoring system 700 can manage power loads at discrete installations, e.g., to balance loads amongst installations in an area during peak times, or to shift loads from peak times to off-peak times at particular locations.

In FIG. 7, monitoring system 700 is sent or queries data and information provided by many sources including SolarGuard monitors 110 (FIG. 1). Such comprises weather station, electrical usage, charge controller, inverter, and revenue metering reports from many subscriber clients each specific to the particular client. A step 702 collects these streams of information, e.g., every fifteen minutes, using an Internet webserver. A step 704 separates the data streams by client, and client identification is used to template such data streams onto models of the clients' equipment configurations and topologies. A step 706 is then able to sort and group client data by categories, e.g., on an anonymous client basis. A common denominator can be applied, like all client systems using a particular brand/model of inverter, or those belonging to a certain virtual utility or community project. Workstations can then be used to access statistics, monitor operational flags, initiate/display reports, and control system operations.

A step 708 accumulates particular client/user information into their respective power accounts. A step 710 can assemble such information on a per account basis to issue client statements, revenue checks, invoices, and controls. Headquarters workstations can be used to access single-client statistics, monitor operational flags, initiate/display reports, and engage payables, receivables, and general ledger accounting operations.

A step 712 posts selected information to the Internet on a webpage for the respective user. Each user can see how much electricity they are generating/using, and the net amount they are exporting. Various kinds of charts and graphics are rendered in HTML to make the data easy to navigate, absorb and understand.

A database 714 is used to store the information collected, and is particularly useful for storing event logs. Such database can be studied to see if any long term trends are at work that could ultimately result in system degradation or a point failure.

Solar systems can supply a typical home's needs for electricity for decades. But even months before it is noticed, unforeseen events and hidden problems like fallen limbs, tripped circuit breakers and eroded wires, can quietly cripple a system's performance. System 700 constantly monitors and reports data on system performance, providing additional assurance that solar investments remain productive and effective throughout their expected life.

In one commercial embodiment, The SolarGuard™ monitoring system collects, monitors and displays critical performance data from solar systems, like production levels and local weather, and transmits that information to webservers every fifteen minutes through the Internet. Specialized application software and technicians evaluate the data for performance changes, and will call customers and help fix problems should they arise. Often, before the customer is even aware that there is a problem. A customer-accessible Web portal provides live data feeds and other information on the status of their system day and night.

Competitive providers usually charge an additional fee for monitoring systems, but in one business model, SolarGuard is included with each system installed because its functionality is critical to long-term system performance and customer goodwill. The SolarGuard Web portal allows customers to see their solar investments in action. Watching a meter spin backwards used to be just about the only way one could see a grid-connected solar system at work. But with SolarGuard, customers can watch online their solar data being collected on a whole new level of interactivity and information. Inside the web portal, customers can see how their systems operate by viewing such data as output over time, weather information, and environmental savings equivalents, like carbon dioxide emissions avoided. All are displayed in an easy to use and easy to understand graphical format.

Monitoring and reporting services can provide valuable systems information using graphics, live system performance data, alerts notification, and environmental benefit tallies. These can all be accessed with any web-enabled device. Automated alerts on system issues help remotely diagnose systems and conduct preventive maintenance to ensure systems are performing as designed. Issues can be resolved more quickly, system performance optimized, on-site visits reduced, and better customer satisfaction.

Sales teams can use webpage views as a powerful sales tool to showcase your successful installations and close more new deals. Live system views encourage customers to visit your website frequently to see how much energy their sites are generating, creating a stronger sense of value delivered. Webpage views can be branded with company logos or enhanced with relevant advertising.

Systems integrators can generate performance reports and collect critical field data to create regional and aggregate data reports to benchmark system performance over time. The data is analyzed to understand the best ways for installation and how to improve system quality. The installation sites can all be controlled using a common site manager. Administrators can get quick access to simple or detailed web views of each site, and remotely monitor system health and performance efficiently. Email notifications can be sent when system faults occur.

Figure 8:
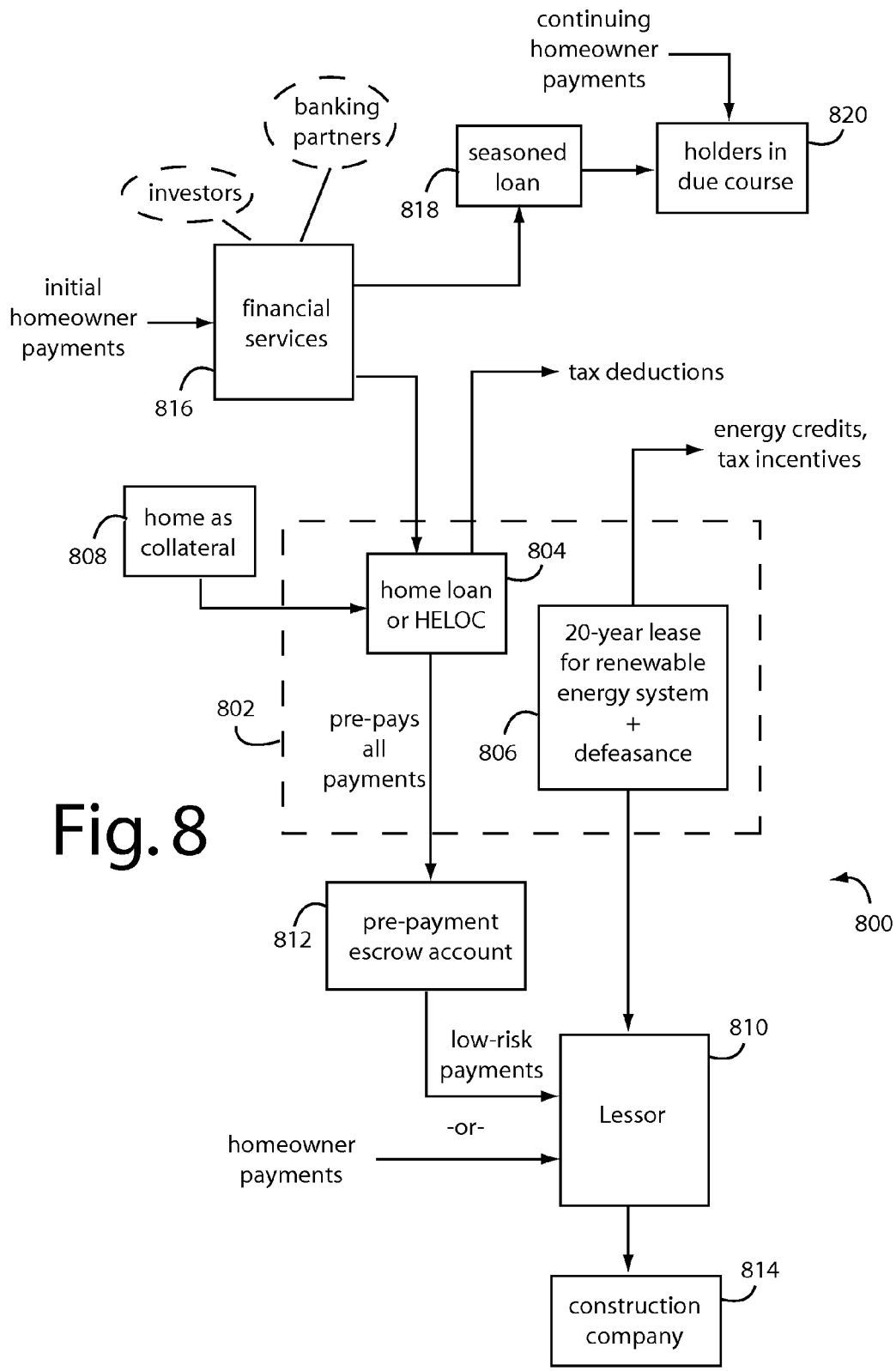
FIG. 8 is a functional block diagram of a financial product and a business method of the present invention.

FIG. 8 represents a business method 800 for financing the sale of a renewable energy system to a homeowner. A two-component financial product 802 is provided to homeowners wanting to buy, install, and operate, e.g., a solar energy system. Proceeds from a home loan or home equity line of credit (HELOC) 804 are indirectly used to obtain and fund a lease 806 for the purchase, installation, and operation of the necessary equipment. Loan 804 uses the homeowner's home as collateral 808, making the interest on the loan 804 tax deductible for the homeowner. The lease 806, for example, is a 20-year equipment lease for solar fixtures.

In one example, such lease provides a 5 kW solar system for $50K total, with a 20% residual of $10,000 to qualify it as a "true" lease. The 20% residual value is due in twenty years at the end of the lease if the homeowner decides to keep the leasehold equipment. The $10,000 figure is therefore the future value (FV). The present value (PV), could be as little as $4,000, and the subject of yet a third component of financial product 802.

Without any defeasance, direct payments could be made by the homeowner to a Lessor 810. In a defeasance arrangement, a trust with a third-party escrow agent 812 is set up to pay all the lease payments to the Lessor 810 over full term of the lease. The escrow agent 812 would include an institution with a high credit rating, so the risk to the Lessor 810 in actually getting the payments in the future is much better than depending on an individual homeowner. Such trust and escrow agent 812 could make the difference with the Lessor 810 in making the lease at all, or could be used to reduce the costs of the lease 806 to the homeowner by getting better rates or terms.

A construction company 814 has some pricing power and nets good profit margins on lease based relationships by leveraging its volume, intellectual property (IP), and innovators advantage. Some of the profit margin could be escrowed as a loss reserve, to cover non-payment at end of lease, loans, etc.

At least the initial payments by the homeowner on the home loan 804 are made to a financial services company 816. It, in turn, may have other investors and banking partners. After several payments are received which demonstrate the validity of the loan and the creditworthiness of the homeowner as the borrower, a seasoned loan 818 can be sold at premium prices to holders-in-due-course 820. A further step would include securitizing home loan 802 in a portfolio that includes reachbacks for loans that do not perform to a particular standard.

In one financial product embodiment of the present invention, the homeowner uses a home loan to prepay twenty years of payments as a defeasance to a lease management company. In accordance with generally accepted accounting principles (GAAP), the money goes into an escrow and is paid to a Lessor, e.g., in a manner that suits their target internal rate of return (IRR) decision criteria. The lease management company, the homeowner, or other assignee, gets the renewable energy credits (REC's, or GreenTags).

In a separate simultaneous, but still distinct transaction, a financial services company provides a home equity line of credit (HELOC) or mortgage to the homeowner for $15k, for example, one that is secured by the home such that the interest will be tax deductible. The terms of loan can be determined later, or could be fully amortizing or interest only for a term of years so all the payments are deductible with a balloon payment at the end.

The internal rate of return (IRR) for a particular lessor is important, because it is a capital budgeting metric used by lessors to decide whether investments should be made. The IRR is an indicator of the efficiency of an investment, in contrast to net present value (NPV), which indicates value or magnitude. The IRR is the annualized effective compounded return rate which can be earned on the invested capital, e.g., the yield on the investment. A proposed project is a good investment if its IRR is greater than the rate of return that could be earned by alternate investments. The IRR should be compared to any alternate costs of capital including an appropriate risk premium. The IRR is defined as any discount rate that results in a net present value of zero of a series of cash flows. In general, if the IRR is greater than a project's cost of capital, or hurdle rate, such project will add value for the company.

Using the examples above, the defeasance payment to prepay all the lease payments on time would be $15k up front, and funded by the home loan. Payments on a twenty year interest-only loan, at 8% interest, are about $100 per month. For a customer with a 33% marginal tax rate, their after-tax cost would actually be about $67/month. At the end of the twenty year term, the homeowner still owes the principal of $15k and has the option to buy out their system for $10k, or have it removed.

The loan payment stream can be seasoned, and then the loan is held, sold, or securitized. Seasoning means allowing the payor/homeowner to make a few payments to show any potential buyer of the promissory note that the loan is a good one and is performing well. A seasoned loan represents a lower risk to the lender or note holder.

Just as the homeowner is prepaying lease payments in present value terms, we can also give the option of them prepaying the "terminal or residual value". That is, if someone would need to pay $10k twenty years from now, they can buy out this obligation at the present value (PV) amount, e.g., $4k. This could be a separate, and conceivably simultaneous contract with the lease, home loan, and any present value of future buyout.

Using such business method, a solar energy business could sell a homeowner a 5 kW system for $100/month, or $67/month after-tax, with $15k due in twenty years. The lessor gets their target IRR, and less risk. The Lessor can hold onto asset for twenty years, or sell system and future value (FV) of payment to a financial services company after a few years.

A construction company or a solar asset management company gets the money to build, monitor and operate, subject to market pricing. A lease company administers the leasing program for the investors, on a fee-basis. A financial services company gets a stream of payments over twenty years and/or partners with an outside lender, and requires some planning or a preexisting relationship.

One alternative method would be to price it as a pay per action (PPA) instead of a fixed monthly payment. The HELOC application and/or lease application processes would be best streamlined to minimize closing costs and perceived barriers, e.g., using automation and the Internet.

In general usage, "refundings" issue new debt with proceeds used to repay previously issued, old debt. In a "current refunding", the new debt proceeds are used to repay the old debt immediately.

In an "advance refunding", as in embodiments of the present invention, the new debt proceeds, the home loan 802, are placed with an escrow agent 808, and invested to pay at a future time the principal and interest, or lease payments, on the old debt, the lease 804. The advance refundings result in defeasance of debt.

Defeasance of debt can be either legal or in substance. A legal defeasance occurs when debt is legally satisfied based on certain provisions in the debt instrument even, though the debt is not actually paid. An in-substance defeasance occurs when debt is considered defeased for accounting and financial reporting purposes, even though a legal defeasance has not occurred. When the debt is defeased, it is no longer reported as a liability on the balance sheet. Only the new debt, if any, is reported as a liability.

Debt is considered defeased in substance for accounting and financial reporting purposes if the debtor irrevocably places cash or other assets with an escrow agent in a trust to be used solely for satisfying scheduled payments of both interest and principal of the defeased debt, and the possibility that the debtor will be required to make future payments on that debt is remote. The trust is restricted to owning only monetary assets that are essentially risk-free as to the amount, timing, and collection of interest and principal. The monetary assets should be denominated in the currency in which the debt is payable. For debt denominated in U.S. dollars, essentially risk-free monetary assets are limited to direct obligations of the U.S. government or those guaranteed by such. These include state and local government securities that the U.S. Treasury issues specifically to provide state and local governments with required cash flows at yields that do not exceed Internal Revenue Service arbitrage limits, and securities backed by U.S. government obligations as collateral and for which interest and principal payments on the collateral generally flow immediately through to the security holder.

Monetary assets held by the trust, e.g., escrow agent 808, must provide cash flows that approximately coincide, as to timing and amount, with the scheduled interest and principal payments on the defeased debt.

The CPA Journal Online reports, in October 1994, that in-substance defeasance is an attractive financing option for companies since it leads to smaller debt-to-equity ratios, bigger reported earnings and better credit ratings. (www.nysscpa.org/cpajournal/old/16373962.htm) Such financing method involves the depositing of cash assets into a trust held by the escrow agent 808 for the single purpose of paying principal and interest as a debt becomes due. In-substance defeasance permits the trust to invest in risk-free securities for so long as the maturity and interest payments coincide roughly with the timing of the defeased debt. The benefits of such financing methods are moderated by the negative effects on cash flow and the qualitative effects the illiquidity causes. So the companies who can use it to best advantage are those that are able to counteract its cash flow effects.

These financial products can be extended into commercial setting, e.g., a business or government agency.

While the lease and loan agreements are separate, the presentation of them can be together and can be configured based on personal preferences, tax circumstances, credit, utility bill size, other financial incentives. A "mix and match" presentation of products could be made, depending on the homeowners needs, and what financial services will be offered to them.

An online platform could be hosted on the Internet to educate customers, and allow them to select lease and loan options that factor in their own information, circumstance, tax rates, credit information, etc.

The mirror side is a system for banks and leasing companies to post their loan and lease products and offer these packages to customers. Banks and leasing companies could sell or auction their loans, leases, and portfolios that they attract by such system.

A renewable energy system business product can include a loan to a homeowner in which the payments by the homeowner are at least in-part tax deductable. A lease is made to the homeowner for the installation and use of a renewable energy system. A deposit of cash proceeds from said home loan is placed into a trust held by an escrow agent for the single purpose of paying lease payments for said lease as each payment becomes due. Then, the proceeds from the home loan are effectively used to defease the debt represented by said lease. All this can be included in a web hosting allowing homeowners to evaluate on-line multiple options and variables in the price, term length, and security interest of a proposed installation and use of a renewable energy system. A parallel web hosting could also be beneficial that would allow lendors and lessors to offer on-line multiple options and variables in the price, term length, and security interest of the proposed installation and use of renewable energy systems.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for financing renewable energy systems, comprising:
displaying by a computing system, home loan options and lease options for a renewable energy system;
receiving, by the computing system, a first selection of a home loan for a homeowner from the loan options;
receiving, by the computing system, a second selection of a lease for the homeowner from the lease options:
arranging the home loan for a homeowner in which the interest payable by the homeowners is at least partly tax deductable;
offering the lease to the homeowner for the renewable energy system;
increasing the profits of selling said renewable energy system by obtaining more favorable lease terms and decisions from a lessor with particular internal rates of return (IRR) decision criteria as a result of defeasing the lease debt;
determining, by the computing system, a deposit of cash proceeds from said home loan into a trust held by an escrow agent for the single purpose of paying lease payments for said lease as each payment becomes due;
receiving a plurality of lease payments for said lease when each payment becomes due thereby seasoning said home loan such that the risk of any holder-in-due course reduced thereby;
selling said home loan to said holder-in-due-course;
selling any renewable energy credits (REC's) that obtain from installing or operating said renewable energy system; and
increasing business operating profits with any tax incentives that obtain from installing or operating said renewable energy system;
wherein, the proceeds from said home loan are effectively used to defease the debt represented by said lease.

2. The method of claim 1, further comprising: selecting a home loan which is interest only.

3. The method of claim 1, wherein the offering the loan includes an energy loan and the offering of the lease includes a power purchase agreement.

4. The method of claim 1 further comprising: securitizing said home loan in a portfolio that includes correcting for loans that do not perform to a particular standard.

5. The method of claim 1, further comprising: increasing the profits of selling said renewable energy system by obtaining more favorable lease terms and decisions from a lessor with particular internal rates of return (IRR) decision criteria as a result of defeasing the lease payment obligations.

6. The method of claim 1, further comprising: pre-paying in present value money any residual due at the end of a full term of said lease in future value (FV) money.

7. The method of claim 1, wherein the offering of said lease is such that said lease qualifies for depreciation and capital gains and losses for at least said homeowner.

8. The method of claim 1, wherein: the arranging of said home loan and the offering of said lease are contemporaneous and prerequisite to other steps of the method of claim 1.

9. The method of claim 1, wherein: the arranging of said home loan and the offering of said lease are selectable from a menu of varieties of loans and leases.

10. The method of claim 1, wherein the debt is defeased, the debt is no longer reported as a liability on a balance sheet.

11. The method of claim 1, further comprising paying, by the computing system, a plurality of lease payments for said lease when each payment becomes due.

12. A non-transitory, computer-readable storage medium containing instructions for controlling a computer system, wherein the instructions, when executed, cause the computer system to be operable to:
display home loan options and lease options for a renewable enemy system;
receive a first selection of a home loan for a homeowner from the home loan options;
receive a second selection of a lease for the homeowner from the lease options;
arrange the home loan for a homeowner in which the interest payable by the homeowner is at least partly tax deductable;
offer the lease to the homeowner for the renewable energy system;
increase the profits of selling said renewable system by obtaining more favorable lease terms and decisions from a lessor with particular internal rates of return (IRR) decision criteria as a result of defeasing the lease debt;
determine a deposit of cash proceeds from said home loan into a trust held by an escrow agent for the single purpose of paying lease payments for said lease as each payment becomes due;
receive a plurality of lease payments for said lease when each payment becomes due thereby seasoning said home loan such that the risk of any holder-in-due-course is reduced thereby;
sell said home loan to said holder-in-due-course;
sell any renewable energy credits (REC's) that obtain from installing or operating said renewable energy system; and
increase business operating profits with any tax incentives that obtain from installing or operating said renewable energy system;
wherein, the proceeds from said home loan are effectively used to defease the debt represented by said lease.

13. The computer-readable storage medium of claim 12, wherein the debt is defeased, the debt is no longer reported as a liability, on a balance sheet.

14. The computer-readable storage medium of claim 13, wherein the instructions, when executed, cause the computer system to be operable to pay a plurality of lease payments for said lease when each payment becomes due.

* * * * *